Feb. 4, 1964   M. W. LUTHER   3,120,119
LIQUID STREAM ANALYZING APPARATUS
Filed Feb. 1, 1962   6 Sheets-Sheet 3

INVENTOR.
MARTIN W. LUTHER
BY
George L. Church
ATTORNEY

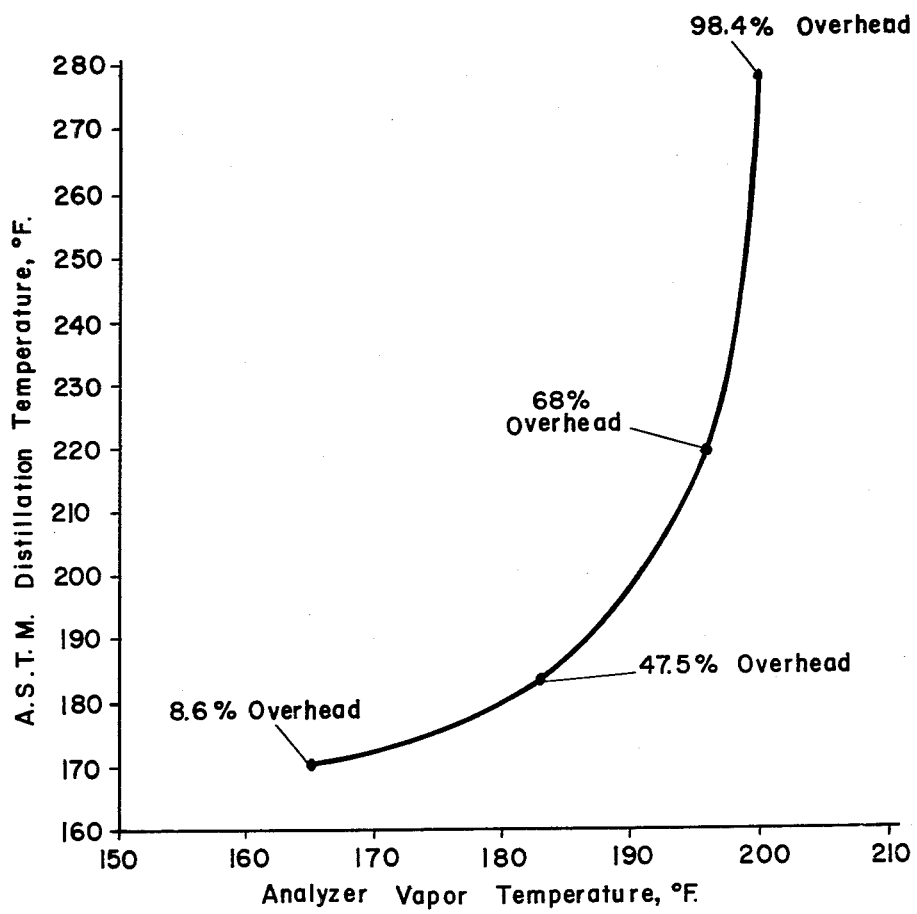

Feb. 4, 1964     M. W. LUTHER     3,120,119
LIQUID STREAM ANALYZING APPARATUS
Filed Feb. 1, 1962     6 Sheets-Sheet 5
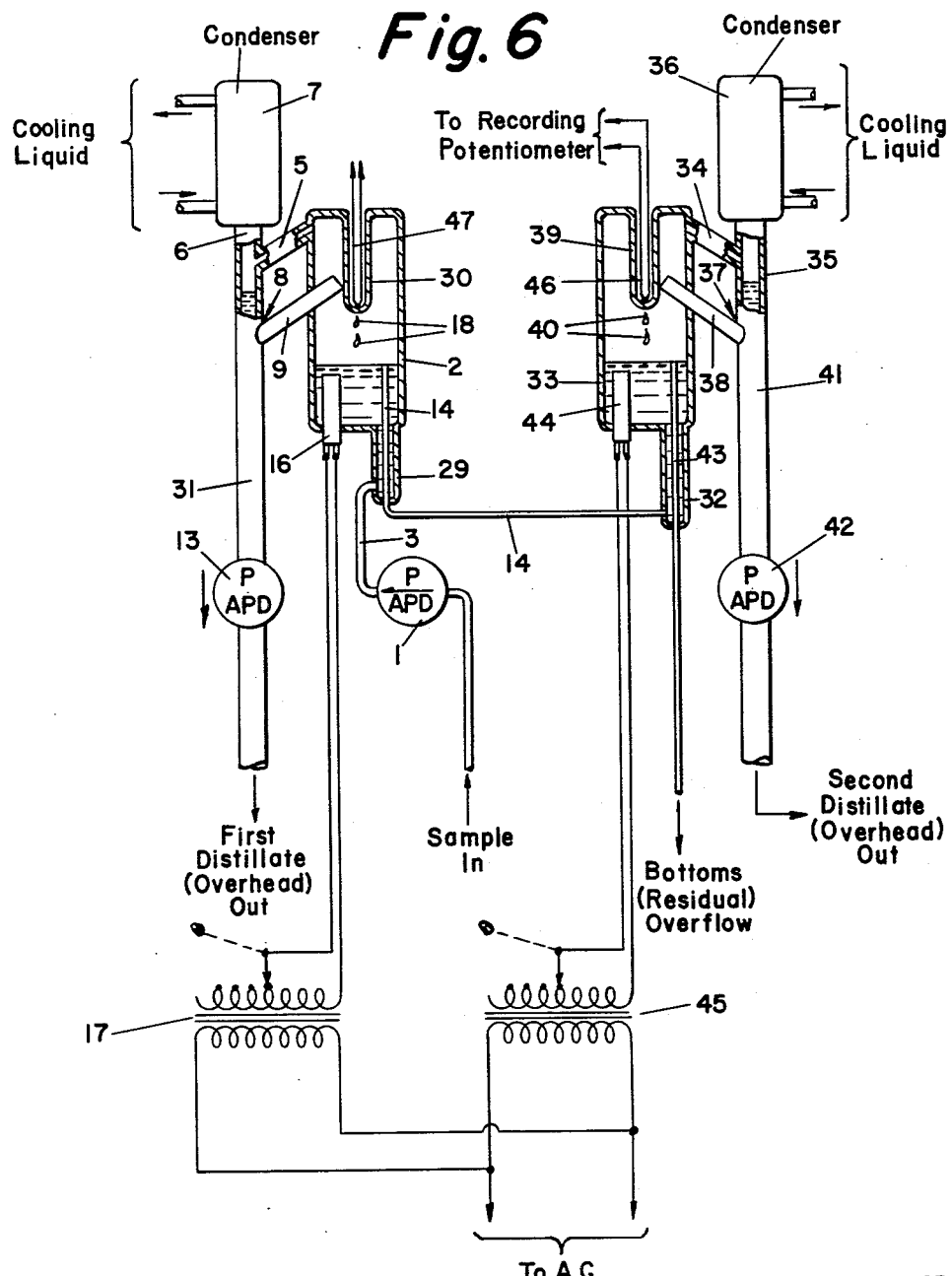
INVENTOR.
MARTIN W. LUTHER
BY
*George L. Church*
ATTORNEY Feb. 4, 1964 M. W. LUTHER 3,120,119
LIQUID STREAM ANALYZING APPARATUS
Filed Feb. 1, 1962 6 Sheets-Sheet 6
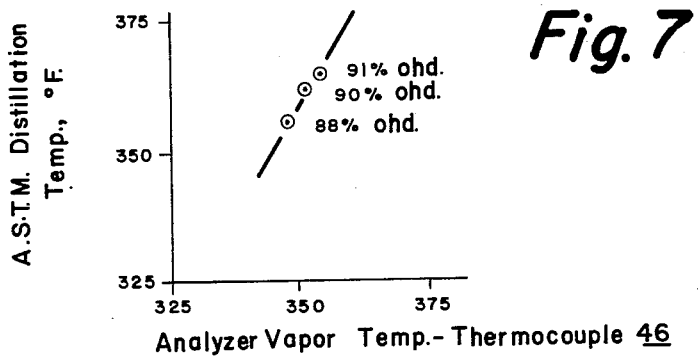
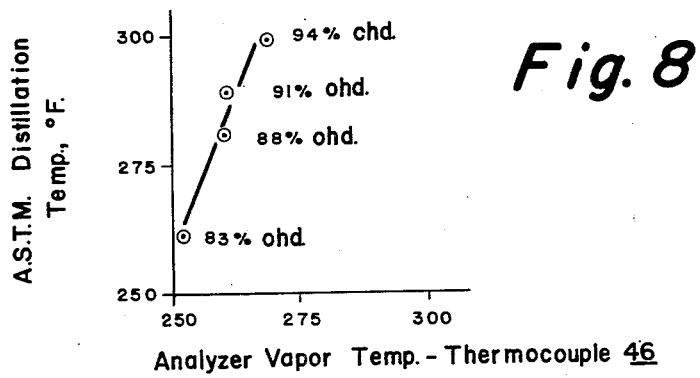
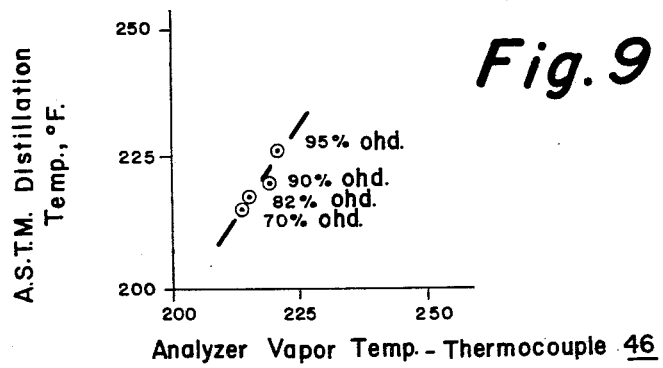
INVENTOR.
MARTIN W. LUTHER
BY George L. Church
ATTORNEY 3,120,119
LIQUID STREAM ANALYZING APPARATUS
Martin W. Luther, Glen Mills, Pa., assignor to Sun Oil Company, Philadelphia, Pa., a corporation of New Jersey
Filed Feb. 1, 1962, Ser. No. 170,582
29 Claims. (Cl. 73—17)

This invention relates to apparatus for analyzing a liquid stream, and more particularly to apparatus for continuously determining the boiling point of a hydrocarbon stream.

This application is a continuation-in-part of my prior copending but now abandoned applications, Serial No. 834,539, filed August 18, 1959, and Serial No. 44,150, filed July 20, 1960.

Boiling range is a very important property of petroleum fractions. Not only is this property used as a specification under which petroleum products are marketed, but refining units are operated to yield fractions of a particular boiling range. It is therefore desirable, in a petroleum refinery, to be able to measure or determine particular preselected boiling points of a petroleum fraction.

The "boiling points" just referred to have in the past been customarily determined in the laboratory, by distilling, batch-wise, a sample of the petroleum fraction in accordance with American Society for Testing Materials (ASTM) procedures. The boiling points most commonly used for the specifications of petroleum products are the ASTM 10%, 50%, and 90% points.

To reduce the need for laboratory distillations (thereby saving manpower), to eliminate delays between the time at which a sample is taken and the time at which information is returned to the operator, and to increase the frequency of boiling point examinations of the product, it is desirable to have instruments which continuously (and automatically) measure and record the boiling point of a refinery stream. It is particularly desirable to have instruments which are capable of continuously measuring any predetermined or preselected distillation point (boiling point), between 15% and 95%.

An object of this invention is to provide novel apparatus for determining any preselected distillation point of a liquid stream.

Another object is to provide novel apparatus for continuously and automatically determining a certain distillation point of a hydrocarbon stream.

A further object is to provide a boiling point analyzer in which the temperature sensitivity requirement for the temperature measuring device is greatly reduced, as compared to prior analyzers.

An additional object is to provide a boiling point analyzer which operates to give a closer approach than prior analyzers to an exact equivalence with ASTM boiling point values, particularly when operating at boiling points of about 70% or higher.

The apparatus of this invention can receive continuously a sample from a line wherein is flowing the liquid stream to be analyzed, and can measure (or record) temperatures which correlate consistently with ASTM distillation temperatures, over a wide range. That is to say, the instruments can be set to record, continuously and automatically, any predetermined distillation point between the initial boiling point (IBP) and the end boiling point (EP). When used as a sensing element, the apparatus will yield a signal which can be fed back to a controller and used to manipulate final control elements, in such a way as to maintain the desired boiling point. In addition, the apparatus (used as a sensing element) can be "cascaded" with an existing automatic control (e.g., flow, temperature, pressure, level, etc.) system; more particularly, the signal yielded by the apparatus of the invention can be used to reset the "set point" (about which the existing control system normally operates) of the control system.

One embodiment of the apparatus of the invention comprises distillation apparatus of more or less conventional type (including a heated distillation vessel or "pot" and a condenser), means for feeding to the pot, at a known and constant rate, the liquid stream to be analyzed, means for extracting distillate from the condenser at another known and constant rate (the latter rate being a fraction, including unity, of the former or feed rate), and means for measuring the vapor temperature above the pot, together with means for draining off excess liquid which tends to accumulate in the pot. The heat supplied to the pot or still may be adjusted manually to obtain a substantial reflux rate, or such heat may be automatically controlled to maintain substantially constant the rate of reflux returned to the still, or the heat may be automatically controlled to supply distillate to the condenser at the same rate at which it is being extracted as overhead product. The vapor temperature may be continuously recorded, as the analysis proceeds, or in some cases, it may be desirable to instead record the temperature of the boiling liquid in the pot.

Another embodiment of the apparatus of the invention utilizes two heated stills cascaded in such a manner that the bottoms overflow from the first still constitutes the feed for the second still. In this case, again, the stream to be analyzed is fed to the first still at a known and constant rate, while overhead or distillate from this first still is removed at a known and constant rate. In this embodiment, overhead or distillate is removed from the second still at a known and constant rate. The final bottoms product overflows from the second still, while the vapor temperature measured in the second still is the analyzer temperature (boiling point) reading. The heat inputs to the two stills are independently manually adjustable.

A detailed description of the invention follows, taken in conjunction with the accompanying drawings, wherein:

FIG. 5 is a curve representing test results obtained with the system of FIG. 4;

FIG. 6 is a diagrammatic illustration of another form or embodiment of apparatus according to the invention; and FIGS. 7, 8, and 9 are curves plotted from data obtained during actual test runs made with the apparatus of FIG. 6.

Figure 1:
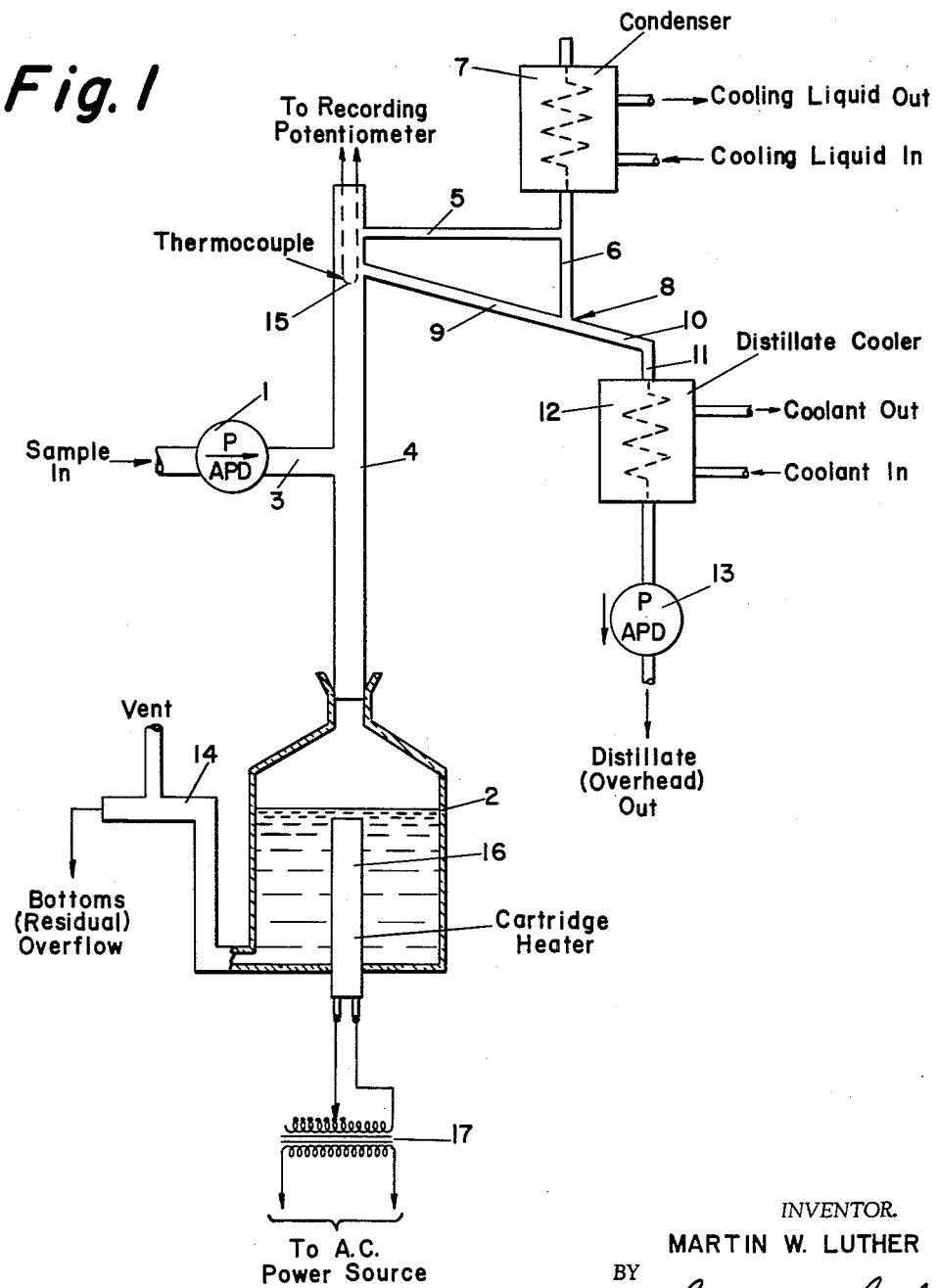
FIG. 1 is a view, partly schematic, of one form or embodiment of apparatus according to this invention.

FIG. 1 is a somewhat schematic view, illustrating in its simplest form a first embodiment of liquid stream analyzing apparatus according to the present invention. There is a certain amount of self-regulation inherent in the arrangement shown in this figure. A sample of the liquid stream to be analyzed is continuously pumped at a constant, predetermined, known rate by an adjustable positive displacement pump 1 into a heated pot or still 2, by way of a conduit 3 which opens into the vertical open tube or column 4 extending upwardly from still 2, at a location just above the upper end of still 2. Near the upper end of column 4, a tube 5 branches out to the side or horizontally, and this latter tube leads via a vertical tube 6 to one end of a condenser 7 which is supplied with cooling liquid (e.g., water) in the manner indicated and which functions to condense the vapor boiled off or emanating from the heated distillation vessel or still 2. It will be appreciated that this vapor reaches condenser 7 by way of column 4 and tubes 5 and 6.

Figure 3:
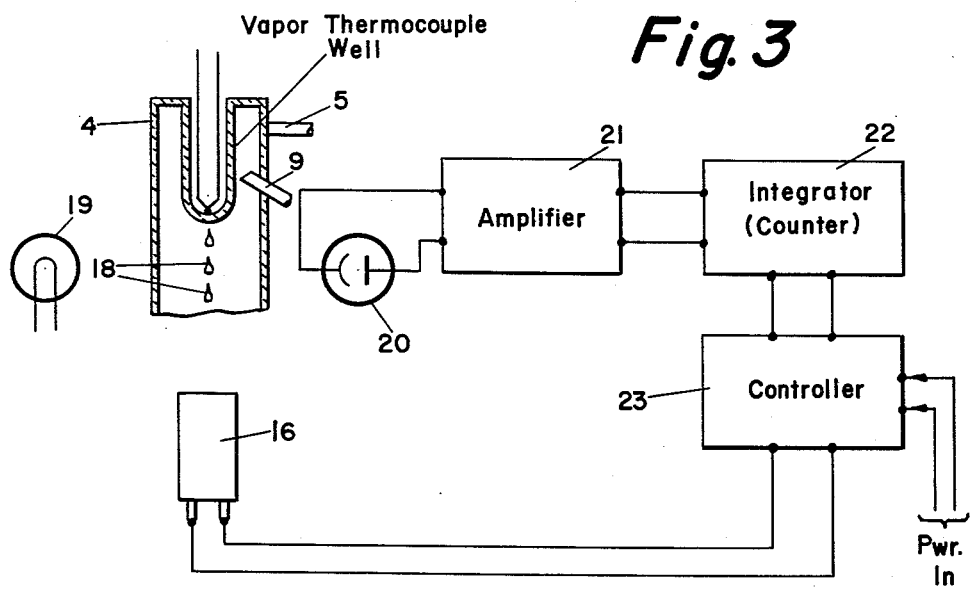
FIG. 3 is a diagrammatic representation of one arrangement for automatically controlling the heat input to the pot of FIG. 1.

The liquid condensate produced by condenser 7 (or, in other words, the distillate) flows from said condenser down vertical tube 6 to the T-junction 8, from whence it can flow along one or both of two separate paths. If there is sufficient distillate available at junction 8, it can flow through the upwardly-inclined short tube 9 back into column 4 and thence down into vessel 2 as reflux; one end of tube 9 ordinarily terminates adjacent a vapor thermocouple well formed at the upper end of column 4. This well is not shown in FIG. 1, but is illustrated in FIG. 3.

The other of the two paths referred to comprises a downwardly-inclined tube 10 (which is, in reality, a continuation of tube 9) extending from junction 8 to the upper end of a vertical tube 11. Below the junction of tubes 10 and 11, a distillate cooler 12 surrounds tube 11. This cooler is supplied with coolant (e.g., water) in the manner indicated, and functions to reduce the temperature of the distillate prior to its application to a pump 13 which has its intake connected to tube 11, below cooler 12. That is to say, the cooler 12 operates to protect pump 13 from possible damage which could result from the application of hot liquid thereto. In some cases (for example, where the pump 13 is of such type that it does not require this protection), the cooler 12 could be eliminated or dispensed with.

The pump 13, like pump 1, is an adjustable positive displacement pump. Such pumps are commercially available and can be adjusted to operate at preselected or predetermined (and constant) rates. They operate in effect as metering pumps, whose metering rates are known and constant. Pump 13, fed through tube 11, operates to continuously pump still overhead (distillate) out of condenser 7 and cooler 12 at a constant, predetermined rate. The rate at which pump 13 operates has a certain relation to the rate at which pump 1 operates, as will appear hereinafter.

Material not taken overhead (by pump 13) is removed from the pot 2 through a bottoms or residual overflow line 14. Line 14 serves as an overflow conduit connected to vessel 2 for draining off excess liquid which tends to accumulate therein; this line is arranged to prevent the liquid in pot 2 from rising above a predetermined level. This level would of course be the horizontal level of the highest portion of line 14. A vent is provided in line 14, as illustrated, to ensure that this overflow line operates properly.

The upper end of distillation column 4 (where tubes 5 and 9 are joined to the column) is formed as a vapor thermocouple well (see FIG. 3), and a thermocouple 15 is inserted into this well. This thermocouple serves as a means whereby the vapor temperature in the distillation apparatus (i.e., the temperature of the vapor produced in vessel or pot 2) may be measured. The vapor temperature is continuously measured, and is recorded by means of a recording potentiometer of conventional type (not shown) which is connected to, and responds to, the thermocouple 15.

The pot 2 and the liquid therein are heated by a cartridge heater 16 of conventional type which extends into the pot or vessel. Heater 16 is supplied with electrical current by means of a variable transformer 17 (illustrated, for example, as having a tapped secondary winding) whose primary winding is connected to a suitable source of power, such as an A.C. power line.

To start up the apparatus described for continuous analysis of a stream of liquid, a sample of the liquid stream to be analyzed is pumped continuously into vessel 2 at a constant, known rate, by means of pump 1. The heat input to heater 16 is adjusted manually (by means of the variable transformer 17) to obtain a substantial reflux rate; this means a substantial flow of distillate up tube 9 and into and down column 4. The reflux can be observed through a glass port (not shown) which is provided at a suitable location along column 4.

To determine a certain distillation point (expressed in percent) with the apparatus of this invention, the rate of (continuous) pumping of pump 13 is adjusted to this same percentage of the rate of pump 1. For example, to determine the 50% distillation point, the rate of pump 13 would be set to 50% or ½ of the rate of pump 1; if pump 1 were continuously operating at a constant rate of 20 cc./minute, pump 13 would then be adjusted to pump continuously at a constant rate of 10 cc./minute. That is to say, the amount of distillate taken overhead (by pump 13) is of course determined by the rate of this pump, and this remains at a predetermined amount, depending on the particular distillation point selected for determination (50%, in the example given). Since the total rate of distillate production is equal to the sum of the rate of pump 13 and the rate of reflux, and since sufficient heat is supplied to pot 2 to obtain a substantial reflux rate when pump 13 is operating, it may be seen that the intake line 11 for pump 13 will never run dry.

If a 50% relation is established between the rates of pumps 13 and 1 (as previously assumed), the device of FIG. 1 may be thought of as a "50% analyzer."

Figure 2:
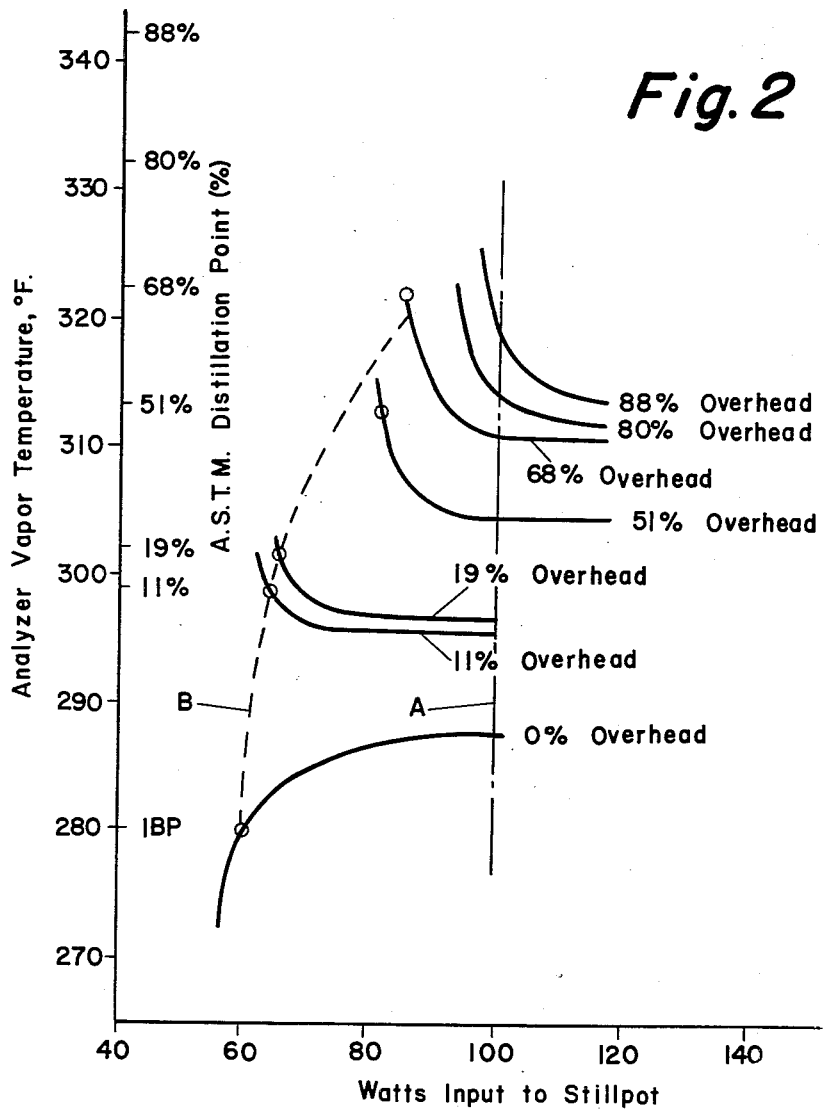
FIG. 2 is a set of curves useful in explaining the operation of FIG. 1.

Refer now to FIGURE 2. In this figure, watts input to the stillpot 2 (i.e., watts input to the pot heater 16) has been plotted against analyzer vapor temperature (as measured by thermocouple 15), for various "overhead" rates, that is, for various rates of pump 13, expressed as percentages of the rate of pump 1. The resulting curves or "plots" (data for which were actually obtained in the laboratory, by suitable measurements), for the various "overhead" rates used, are denoted in FIG. 2 by the corresponding "overhead" legends. For convenience, there is included in this figure a vertical scale showing percentage of sample distilled, at the temperatures corresponding to ASTM distillation vapor temperatures, as measured by ASTM procedures in the laboratory. In other words, the "analyzer vapor temperature" scale in FIG. 2 also serves as an "ASTM distillation temperature" scale, in connection with the "ASTM distillation point" (percentage) scale. In connection with FIG. 2, it is desired to be pointed out that the circled points located near curve B (which curve will be further referred to hereinafter) merely indicate where horizontal lines projected from various ASTM distillation points intersect the respective (corresponding) percentage "overhead" curves; these circled points do not represent plots of watts input vs. analyzer vapor temperature.

From FIG. 2, it may be seen that the analyzer vapor temperature (as sensed by thermocouple 15) will remain substantially constant for each particular "overhead" rate, over a fairly wide range of heat input above a certain value, under the assumption that the composition of the liquid stream (sample) does not change. For example, if the overhead pump 13 has been set to pump at 51% of the rate of feed pump 1 (see the curve labeled "51% overhead" in FIGURE 2), the curve shows that the analyzer vapor temperature will remain substantially constant at 305° F. if heat input is above 95 watts. This means that the measured vapor temperature is substantially independent of the heat supplied to the pot so long as sufficient heat is supplied to obtain a substantial reflux rate (as previously described).

Once the pump rate (of pump 13) has been set or adjusted to the particular boiling point selected (for example, the 51% point), and the stillpot heat input has been adjusted manually as described, continuous analysis of the liquid stream is effected by measuring (and recording) the vapor temperature, as sensed by thermocouple 15. The measured vapor temperature changes automatically, in response to changes in the 51% distillation point (or any other preselected distillation point) of the product stream, without any further manual adjustment of the variable transformer 17 or of the heat supplied to pot 2. As previously described, any predetermined or preselected boiling point may be selected for control or analysis, by proper correlated adjustment of the rates of pumps 1 and 13.

If desired, a calibration or correlation curve (an example of such a curve is given in FIG. 5) can be used to determine ASTM distillation temperature points, from the (analyzer) vapor temperature reading obtained with the apparatus of this invention. For example, for 51% overhead, the vapor temperature of 305° F. given by the apparatus (see FIG. 2) could be used to find the corresponding ASTM distillation temperature point of about 313° F., by means of a calibration curve. However, for mere guidance of the operator, this conversion to the ASTM distillation temperature point does not need to be made; once the apparatus of the invention has been properly set up and is operating in a continuous manner, variations in the vapor temperature reading (of the apparatus) alone will determine whether the product from a refinery distillation column or other unit is departing from the desired control point.

Referring again to FIGURE 2, note that it is possible to select a single pot heat input, such as that represented by dot-dash line A, and utilize it over a fairly wide range of percent overhead (for example, from 0% to above 68%) without changing the shape of the correlation or calibration curve relating analyzer vapor temperature reading and ASTM distillation temperature point. In other words, the vapor temperatures determined with the apparatus of this invention correlate consistently with ASTM distillation points, over a wide range of percent overhead or percent distillation points. This is due to the fact that the "overhead" curves in FIG. 2 tend to "flatten out" or reach a constant analyzer vapor temperature, toward the right.

The preceding description applies to a condition where heat input to the pot is sufficiently high to ensure a substantial reflux rate. Under these conditions, analyzer vapor temperatures respond to ordinary changes in the boiling range of a particular liquid stream being analyzed, without manual adjustment of pot heat. If it is desired to change from one product to another of different boiling range (such a change would arise, for example, if one instrument or apparatus were used for gasoline, naphtha, and kerosene on a time-sharing basis), manual heat adjustment may be necessary to ensure that the heat input to the pot is always sufficient to maintain the required distillate or overhead pump rate; under the conditions described, for substantial reflux, the boil-up rate must exceed the distillate pump rate. To eliminate or reduce manual attention, the heat input to the pot may be automatically controlled to maintain a substantially constant rate of total distillate production.

FIGURE 3 discloses an arrangement of the type just mentioned. In FIGURE 3, the heat input to the pot is automatically controlled to maintain a predetermined, substantially constant (small) reflux rate, which means a substantially constant total distillate production rate because overheads pump 13 extracts distillate from the apparatus at a constant rate.

The FIGURE 1 arrangement is modified in FIGURE 3 by the addition of a counter for sensing drops 18 of reflux falling from the vapor thermocouple well. The counter includes a light source 19 which projects light through the distillation column 4 toward a photoelectric cell 20. The drops 18 of reflux fall from the vapor thermocouple well during operation of the apparatus as described, and these drops, in passing downwardly through column 4, effect the transmission of light from source 19 to photoelectric cell 20; the drops 18 pass between source 19 and photoelectric cell 20.

The output of photoelectric cell 20 is fed to an amplifier 21 which amplifies the individual pulses resulting from the passage of the individual drops 18 between items 19 and 20. The output of amplifier 21 is fed to an integrator or counter 22 which in effect counts the number of drops 18 which fall during a certain time interval, and produces a signal proportional to this number of drops. The signal produced by unit 22 is fed to a controller 23 which controls the power supplied to cartridge heater 16, so as to automatically control the heat input to the stillpot 2.

The automatic control loop described, including items 19–23, operates to control the power supplied to heater 16 so as to maintain a reflux rate in the vicinity of 10 to 20 drops/minute, and to maintain the reflux rate substantially constant at some value within this range of 10–20 drops/minute. More particularly, when the rate of reflux drops 18 decreases below the controlled value as a result of insufficient pot heat, the signal produced by unit 22 causes controller 23 to feed more power to heater 16 (thereby to increase the total distillate production rate and thus also the reflux rate); when the rate of reflux increases above the controlled value as a result of excessive pot heat, the signal produced by unit 22 causes controller 23 to feed less power to heater 16 (thereby to decrease the total distillate production rate and thus also the reflux rate).

Units 21, 22, and 23 are entirely conventional in construction and function in a known manner, so will not be described further herein.

The addition of the automatic heat controller, as in FIGURE 3, causes the vapor temperatures measured with the apparatus of the invention to agree more closely with the ASTM distillation temperatures. Operation with the drop counter heat controller of FIGURE 3 would be somewhat along the dashed line B of FIGURE 2, for any particular desired (predetermined or preselected) distillation point within the range of 0% overhead (to obtain the IBP of the sample) to 68% overhead or above (68% overhead corresponding, of course, to the 68% distillation point). As may be seen in FIGURE 2, the points where dashed line B intersects the various "overhead" curves (0%, 11%, 19%, 51%, 68%) are substantially exactly aligned, horizontally, with the corresponding percentage points on the "ASTM Distillation Point" vertical scale.

Figure 4:
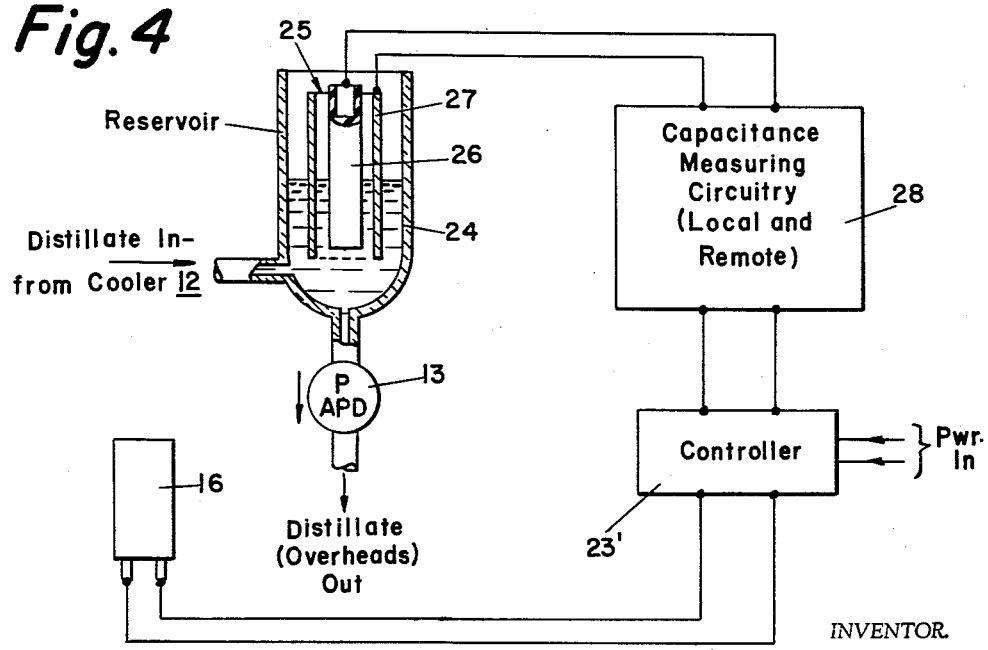
FIG. 4 is a diagrammatic representation of another arrangement for automatic heat control.

FIGURE 4 discloses another arrangement for controlling the pot heat automatically to maintain a substantially constant rate of total distillate production, thereby eliminating manual adjustment of this heat. In FIGURE 4 the distillate production rate is maintained equal to the rate of overheads pump 13, and no reflux from the condenser 7 is returned to the column 4.

In the arrangement of FIGURE 4, distillate from the cooler 12 of FIGURE 1 is conducted to a reservoir 24, from which a connection extends in turn to the intake of overheads pump 13; it may thus be seen that the reservoir 24 is located ahead of the overheads pump. The reservoir 24 may, in practice, be a cylindrical vessel made of glass, and in this vessel there is positioned a capacitive-type liquid level probe, indicated generally by the numeral 25. Such a probe comprises two elongated spaced concentric electrodes between which can enter the liquid whose level is being measured; the effective capacitance of the condenser formed between these electrodes depends on the level or height of the dielectric liquid therebetween. The liquid level probe assembly 25 comprises an inner metallic rod 26 which has an electrically-insulating coating thereon and a hollow metallic cylinder 27 surrounding rod 26 but spaced therefrom.

The electrodes 26 and 27 are connected to a unit 28, which comprises the "local" and "remote" portions of capacitance measuring circuitry. Reference may be made to the Shawhan Patent No. 2,943,258, issued June 28, 1960, for a detailed disclosure of typical "local" and "remote" circuitry which can be used in unit 28, as well as a detailed description of the operation of the capacitive-type probe 25 to sense the liquid level in reservoir 24.

The unit 28 functions in association with probe 25 to produce a signal proportional to the liquid level in reservoir 24. The signal so produced is fed to a controller 23' which controls the power supplied to cartridge heater 16, so as to automatically control the heat input to the stillpot 2.

The automatic control loop described, including items 24–28 and 23', operates to control the power supplied to heater 16 so as to maintain a substantially constant liquid level in reservoir 24, the distillate in this reservoir being maintained at a level somewhat below the top of the reservoir. More particularly, when the liquid in reservoir 24 drops below the desired level as a result of insufficient pot heat, the signal produced by unit 28 causes controller 23' to feed more power to heater 16 (thereby to increase the distillate production rate and thus bring the reservoir liquid level back up); when the liquid in reservoir 24 rises above the desired level as a result of excessive pot heat, the signal produced by unit 28 causes controller 23' to feed less power to heater 16 (thereby to decrease the distillate production rate and thus bring the reservoir liquid level back down).

Since the liquid in reservoir 24 is thus maintained, by the system of FIGURE 4, at a substantially constant level, it may be seen that the heat input to the pot is controlled by this system to maintain a distillate rate (from the cooler 12) just equal to the overheads pump 13 rate, which latter rate is of course constant.

The vapor temperature reading obtained with the analyzer of this invention, when using the system of FIGURE 4, again correlates consistently with the corresponding ASTM distillation temperature, for various percentages of distillate within a rather wide range. A typical correlation or calibration plot is shown in FIGURE 5, wherein the analyzer vapor temperatures (i.e., vapor temperatures obtained with the analyzer of this invention) are measured along the horizontal axis, and ASTM distillation temperatures are measured along the vertical axis, for various percentages of overhead or distillate. The curve drawn through the points plotted in this manner (the points being plotted from data actually obtained experimentally, in the laboratory) relates analyzer vapor temperature to ASTM distillation temperature. It may be seen that the slope of the curve in FIGURE 5, over a considerable portion of its length, is close to unity, which means that increments of analyzer vapor temperature are equivalent numerically to increments of ASTM distillation temperature.

When it is desired to determine boiling points above the 70% point, some modification of the apparatus may be necessary. It has been found that in this range the liquid temperature of the boiling material in the pot 2 will respond to changes in boiling points better than the vapor temperature. One explanation for this may be as follows: Above 70% overhead, packing is ordinarily used in the column 4 to improve fractionation; this leaves heavier components in the pot, thus showing therein temperatures which are higher and approach more closely the corresponding ASTM distillation points or temperatures. In this connection, note that the curve in FIGURE 5 steepens toward higher overhead rates, which indicates that the analyzer vapor temperatures are becoming too low, as compared to the ASTM temperatures; as just stated, the boiling liquid temperatures are higher than the vapor temperatures under these conditions.

When it is desired to determine boiling points above about 70%, the apparatus may be modified by providing a thermocouple well in the pot 2, a thermocouple being inserted therein so as to be in thermal contact with the liquid. This modified apparatus is not illustrated in the drawings, since the construction thereof is believed clear without such illustration. Using this modified apparatus, after the pump rates are adjusted to the desired percentage relationship, a record would be continuously made of the temperature of the boiling liquid in the pot, as measured by the "liquid" thermocouple. This recorded temperature would then be used as the analyzer temperature.

Often, the 90% point of a petroleum fraction is used as a control point for products distilled in refinery distillation columns. The previously-described embodiment of the boiling point analyzer requires a temperature measuring device of rather high sensitivity when recording boiling points above approximately 70%, in order to give a reasonable equivalence between the change in boiling point (as observed by laboratory or ASTM determination) and the change shown by the analyzer. This is illustrated in FIG. 5. In the vicinity of 90% distilled (i.e., 90% overhead), the slope of the curve which is, in effect, the characteristic curve of the analyzer, is estimated at 15.0 (expressed in degrees change in ASTM boiling point divided by degrees change in analyzer reading). This value of 15.0 represents the high sensitivity required of the temperature measuring device of FIG. 1, when recording the 90% point of a liquid stream.

It is desirable to reduce this high temperature sensitivity requirement. The embodiment illustrated in FIG. 6, to now be described, operates to reduce this high temperature sensitivity requirement, and to give a closer approach to an exact equivalence with ASTM boiling point values. By way of example, it will be described as a "90% analyzer," i.e., an analyzer which continuously measures and records the 90% point of a hydrocarbon stream.

FIG. 6 is a somewhat diagrammatic view, illustrating another embodiment of liquid stream analyzing apparatus according to this invention. In this figure, parts similar to those of FIG. 1 are denoted by the same reference numerals. A sample of the liquid hydrocarbon stream to be analyzed is continuously pumped or fed at a constant, predetermined feed rate by an adjustable positive displacement pump 1 into a first heated distillation vessel or pot 2 (which may be considered as the first stage of the analyzer), by way of a conduit 3 opening into a tubular member 29 which extends downwardly from the base of the vessel 2 and which communicates at its upper end with the interior of the vessel. At the upper end of vessel 2, a vapor tube 5 extends out laterally from this vessel, and this latter tube leads via a vertical tube 6 to one end of a condenser 7 which is supplied with cooling liquid (e.g., water) in the manner indicated and which functions to condense the vapor boiled off or emanating from the heated distillation vessel or still 2. It will be appreciated that this vapor reaches condenser 7 by way of tubes 5 and 6.

The liquid condensate produced by condenser 7 (or, in other words, the distillate or "overhead") flows from said condenser down vertical tube 6 to the T-junction 8, from whence it flows along two separate paths. A small portion of the distillate flows through the upwardly-inclined short tube 9 back into vessel 2, as reflux. The end of tube 9 opposite to junction 8 terminates adjacent a vapor thermocouple well 30 provided at the upper end of vessel 2, and the drops 18 of reflux fall from the bottom end of this well down into vessel 2. During proper operation of the analyzer, there is always sufficient distillate available at junction 8 to provide a small amount of reflux 18.

The other of the two paths referred to comprises a vertical tube 31 (which is, in reality, a continuation of tube 6) extending downwardly from junction 8 to the intake of a pump 13. The pump 13, like pump 1, is of the adjustable positive displacement type. Pump 13, fed through tube 31, operates to continuously pump still overhead (distillate) out of condenser 7 at a constant, predetermined and known rate. The rate at which pump 13 operates has a certain relation to the rate at which pump 1 operates, as will appear hereinafter.

Material not taken overhead by pump 13, which material is the bottoms of the first stage, is removed from the vessel 2 through a bottoms overflow line 14 whose upper end opens into vessel 2 at a point about ⅓ of the length of vessel 2 above the base thereof. Line 14 is of smaller diameter than tubular member 29 and is mounted concentrically of this latter member. Line 14 is sealed through the bottom end of member 29 and extends sideways a little distance to open into a tubular member 32 which extends downwardly from the base of a second heated distillation vessel 33 and which communicates at its upper end with the interior of vessel 33. Vessel 33 may be considered as the second stage of the analyzer. Line 14 serves as an overflow conduit connected to vessel 2 for draining off excess liquid which tends to accumulate therein; this line is arranged to prevent the liquid in still 2 from rising above a predetermined level, which level is that of the upper end of line 14. Since the FIG. 6 embodiment employs two stages, the bottoms from the first stage 2 may be termed intermediate bottoms. By means of line 14 and tubular member 32, intermediate bottoms from the first stage vessel 2 flows to the second stage vessel 33. In other words, the bottoms overflow from the first vessel 2 is utilized as the feed for the second vessel 33. Thus, it may be seen that the rate of feed to the second stage 33 is equal to the difference between the feed rate to the first stage (rate of pump 1) and the distillate or overhead extraction rate of the first stage (rate of pump 13).

At the upper end of vessel 33, a vapor tube 34 extends out laterally from this vessel, and this latter tube leads via a vertical tube 35 to one end of a condenser 36 which is supplied with cooling liquid (e.g., water) in the manner indicated and which functions to condense the vapor boiled off or emanating from the heated distillation vessel or still 33. It will be appreciated that this vapor reaches condenser 36 by way of tubes 34 and 35.

The distillate or overhead produced by condenser 36 flows from said condenser down vertical tube 35 to the T-junction 37, from whence it flows along two separate paths. A small portion of the distillate flows through the upwardly-inclined short tube 38 back into vessel 33, as reflux. The end of tube 38 opposite to junction 37 terminates adjacent a thermocouple well 39 provided at the upper end of vessel 33, and the drops 40 of reflux fall from the bottom end of this well down into vessel 33. During proper operation of the analyzer, there is always sufficient distillate available at junction 37 to provide a small amount of reflux 40.

The other of the two paths just referred to comprises a vertical tube 41 (which is, in reality, a continuation of tube 35) extending downwardly from junction 37 to the intake of a pump 42. The third pump 42, like the second pump 13 and the first pump 1, is of the adjustable positive displacement type. Such pumps are commercially available and can be adjusted to operate at preselected or predetermined (and constant) rates. They operate in effect as metering pumps, whose metering rates are known and constant. Pump 42, fed through tube 41, operates to continuously pump still overhead (distillate) out of condenser 36 at a constant, predetermined rate. The rate at which pump 42 operates has a certain relation to the rate of feed at 14 to the second vessel 33 (as also, of course, to the rate of pump 1), as will appear hereinafter.

Material not taken overhead by pump 42, which material is the bottoms of the second stage (or final bottoms), is removed from the vessel 33 through a bottoms overflow line 43 whose upper end opens into vessel 33 at a point about ⅓ of the length of vessel 33 above the base thereof. Line 43 is of smaller diameter than tubular member 32 and is mounted concentrically of this latter member. Line 43 is sealed through the bottom end of member 32, and serves as an overflow conduit connected to vessel 33 for draining off excess liquid which tends to accumulate therein; this line is arranged to prevent the liquid in still 33 from rising above a predetermined level, which level is that of the upper end of line 43.

The first stage vessel 2 is heated by a cartridge-type immersion heater 16. Heater 16 is supplied with electric current by means of a variable transformer 17 (illustrated, for example, as having a tapped secondary winding) whose primary winding is connected to a suitable source of power, such as an A.C. power line. The second stage vessel 33 is heated by a similar cartridge-type immersion heater 44, supplied with electric current by means of a variable transformer 45 whose primary winding is connected to the power line. Thus, the heat input to each of the two stages 2 and 33 may be independently adjusted, manually, by the respective variable transformers 17 and 45. Vapor temperatures in the two vessels remain constant over a fairly wide range of heat input, when the rates of pumps 1, 13, and 42 have been set (as hereinafter described) to obtain the boiling point desired. As explained hereinabove, heat input is not critical, so long as it exceeds the minimum rate. This excess of heat input over the minimum rate of heat input is evidenced by a substantial reflux rate at 18 and 40, and the heat input to both vessels 2 and 33 should be adjusted to provide this reflux. So long as there is sufficient distillate available at 8 and 37 to provide substantial reflux in the respective vessels, the pumps 13 and 42 will never run dry.

If desired, automatic reflux control of pot heat input, or automatic distillate level control of pot heat input, may be applied to each stage, using the principles disclosed in FIGS. 3 and 4, respectively. However, neither of these refinements is necessary for successful operation of the embodiment of FIG. 6.

As previously described, a thermocouple well 39 is provided at the upper end of vessel 33. A thermocouple 46 is inserted into this well. This thermocouple serves as a means whereby the vapor temperature in the second stage (i.e., the temperature of the vapor produced in vessel 33) may be measured. In using the FIG. 6 embodiment, the vapor temperature in the second stage 33 is continuously measured, and is recorded by means of a recording potentiometer of conventional type (not shown) which is connected to, and responds to, the thermocouple 46. The vapor temperature measured in the second stage is the analyzer temperature corresponding to the total overheads (expressed in percent of total feed) taken in the two stages. For example, if the total overheads is 90%, the temperature measured by thermocouple 46 will be the 90% point of the stream, as measured by the analyzer.

As previously stated, the 90% point of a hydrocarbon stream (i.e., the temperature at which 90% of the charge is distilled off or goes overhead) is an important control point used in petroleum product fractionation. A number of runs were made with the two-stage analyzer of FIG. 6, feeding thereto hydrocarbon streams of widely different boiling ranges, to evaluate the analyzer performance at the 90% point. Pumping rates of the pumps 1, 13, and 42 were adjusted to get roughly the same proportion of overhead from each stage, when expressed as volume percent of the feed to that same stage. In this connection, it will be recalled that the feed to the second stage 33 equals the feed to the first stage 2 (determined by pump 1) less the overhead pumped from stage 2 (determined by pump 13). By way of example, the total overheads will amount to 90% of the stream sample fed to the first stage 2 when each stage distills 68.4% of the material entering or fed to that stage. In this case, the overhead from the first stage 2 would obviously be 68.4% of the total feed. The overhead from the second stage 33 is 68.4% of the feed to this second stage; the feed to the second stage is 100%

—68.4%, that is, 31.6%, of the total feed. The overhead from the second stage is then .684×31.6%, equal to 21.6%, of the total feed, which added to the 68.4% overhead from the first stage gives a total overhead of 90% of the feed supplied by pump 1.

Continuing with the same example, if pump 1 were continuously operating at a constant rate of 100 cc./minute, then pump 13 would be adjusted to pump continuously at a constant rate of 68.4 cc./minute, which means that the intermediate bottoms (feed to vessel 33) would be flowing at a rate of 31.6 cc./minute. Pump 42 would then be adjusted to pump at a constant rate of 68.4% of this latter rate, which comes out to 21.6 cc./minute.

Although the maximum improvement in results (with the two-stage boiling point analyzer of this invention) would be expected when the ratio of overhead to total feed for the first stage is exactly equal to the ratio of overhead to feed (intermediate bottoms, in this case) for the second stage, large amounts of improvement are obtainable in cases wherein there is some disparity or inequality in the overhead-feed ratios for the two stages, but wherein such inequality is not great. By way of example, the total overheads will also amount to 90% when the overhead-feed ratio is 70% in the first stage, and 66⅔% in the second stage. In this latter example, if the rate of pump 1 is 100 cc./minute, the rate of pump 13 would be adjusted to 70 cc./minute, the feed to vessel 33 then being 30 cc./minute. Pump 42 would be adjusted to ⅔ of this latter rate, or 20 cc./minute, which added to the 70 cc./minute of pump 13 gives a total overheads rate of 90 cc./minute.

The results of the runs previously referred to are presented in FIGS. 7, 8, and 9. In these figures, the analyzer vapor temperatures (i.e., vapor temperatures measured by thermocouple 46) are plotted along the horizontal axes, and corersponding ASTM distillation temperatures are plotted along the vertical axes, for various percentages of overhead or distillate. The ASTM distillation temperatures were obtained by batch-wise distillations, in the laboratory, in the conventional manner. The curves drawn through the points plotted as described (from data actually obtained experimentally) relate analyzer vapor temperature to ASTM distillation temperature. To prepare FIG. 7, runs were made for 91%, 90%, and 88% overhead; to prepare FIG. 8, for 94%, 91%, 88%, and 83% overhead; to prepare FIG. 9, for 95%, 90%, 82%, and 70% overhead. The following table provides other pertinent data for these figures:

| Figure | Refinery Stream | I.B.P. (Degrees F.) | E.B.P. (Degrees F.) | Slope (90% point) |
|---|---|---|---|---|
| 7 | Reformate Fraction | 285 | 393 | 1.66 |
| 8 | Catalytic Gasoline | 130 | 336 | 2.77 |
| 9 | Xylene Feed | 204 | 253 | 1.37 |

The last column in the above table, which lists the slopes of the FIGS. 7–9 curves in the vicinity of 90% distilled or overhead, is the one to be particularly noticed. These slopes are obtained by dividing the degrees change in the ASTM temperature by the degrees change in the analyzer vapor temperature (the latter being measured by thermocouple 46). As previously stated, the slope of the curve obtained with the single-stage analyzer of FIG. 1, in the vicinity of 90% distilled, was estimated at 15.0. This latter curve appears as FIG. 5, and is for a Udex Raffinate feed. The marked improvement obtained with the two-stage embodiment of FIG. 6 (compared to the single-stage embodiment of FIG. 1), when operating at boiling points of 70% or higher (in particular, at 90%) will be appreciated when the slope value of 15.0 (for the FIG. 1 embodiment) is compared with the much lower slope values of 1.66, 2.77, and 1.37 (for the FIG. 6 embodiment). It can thus be seen that, for the FIG. 6 embodiment, the temperature sensitivity requirement for the temperature measuring device is greatly reduced (by a division factor of about 15.0/1.93, or more than 7.7) as compared to the embodiment of FIG. 1, when operating at the 90% point, thereby giving a much closer approach to exact equivalence with ASTM values.

The continuous analyzers of the present invention may be thought of as employing "flash distillation," while the ASTM laboratory or batch-wise procedure may be termed "fractional distillation."

There will now be presented a brief explanation of the mode of operation of the FIG. 6 embodiment, to produce the beneficial results obtained. The first vessel or still 2 eliminates (by causing them to go overhead) the lower-boiling components or "lighter ends" of the petroleum fraction being analyzed. The second vessel or still 33, which has as its feed the intermediate bottoms from still 2, therefore is working on only the "heavier ends," and is also working at a lower rate of feed than if it were the only vessel; thus, the second vessel is working in a region where there is a small difference between the analyzer reading (vapor temperature reading) and the ASTM temperature reading.

Referring again to FIG. 6, it is evident that the temperature signal from the first stage 2 may be recorded if desired, as well as that from the second stage 33. The vapor temperature in the first stage may be measured by means of a thermocouple 47 inserted into well 30, this thermocouple being connected to suitable recording equipment. According to the examples previously given for 90% total overhead, the thermocouple 47 would measure the 68.4% point of the feed, or it would measure the 70% point of the feed. Either of these two last-mentioned points may be of some interest, for particular products.

It should be easily possible to continuously record the 10% and 90% points of a hydrocarbon stream simultaneously by employing a three-stage cascaded arrangement of stills or vessels, utilizing the principles previously described. In a three-stage arrangement, the bottoms overflow from the second vessel would be used as feed for a third distillation vessel, from which overheads would be removed by a fourth adjustable positive displacement pump. The final bottoms overflow would then be from the third stage. In this arrangement, the first stage might distill 10% of the material entering the stage, while the last two stages might each distill 66⅔% of the material entering the respective stages. An example should serve to make this clearer. If the feed pump rate to the first vessel or stage is 100 cc./minute, the overheads pump for this stage might be set at 10 cc./minute, leaving 90 cc./minute bottoms overflow from the first stage feeding to the second stage or vessel. Of this 90 cc./minute feed to the second stage, the overheads pump for this stage might be set at ⅔ of this feed, or at 60 cc./minute. This would leave 30 cc./minute bottoms overflow from the second stage feeding to the third stage or vessel. Of this 30 cc./minute feed to the third stage, the overheads pump for this stage might be set at ⅔ of this feed, or at 20 cc./minute. This would leave 10 cc./minute as the final bottoms overflow from the third stage. The sum of the overheads from the three stages would then be 10+60+20, or 90 cc./minute, which would be 90% of the total feed of 100 cc./minute.

A thermocouple in the first stage or vessel, measuring vapor temperature therein, could then be used to continuously record the 10% point of the stream, while a thermocouple in the third stage or vessel, measuring vapor temperature therein, could be used to continuously record the 90% point of the stream, simultaneously with the 10% recording previously mentioned. In this arrangement, of course, a thermocouple in the second stage or vessel, measuring vapor temperature therein, could be used to continuously record the 70% point of the stream, if this latter point is meaningful.

The invention claimed is:

1. In apparatus for analyzing a stream of liquid to determine any preselected distillation point thereof, distillation apparatus including a heated distillation vessel for vaporizing at least a portion of the liquid fed thereto and a condenser for condensing vapors produced in said vessel; means for returning distillate from said condenser to said vessel as reflux, means for feeding at a first predetermined rate to said vessel the liquid stream to be analyzed, means for extracting distillate from said condenser and apparatus at a second rate which is made to be a preselected fraction including unity of said first rate, and means for measuring the temperature of the vapor produced in said vessel as an indication of the selected distillation point of said stream.

2. Apparatus for analyzing a stream of liquid to determine a particular distillation point thereof, comprising a distillation vessel, means for feeding at a first predetermined rate to said vessel the liquid stream to be analyzed, controllable means for heating said vessel to vaporize at least a portion of the liquid fed thereto, a condenser coupled to said vessel for condensing vapors produced therein, means for returning distillate from said condenser to said vessel as reflux, means for removing distillate from said condenser and vessel at a second rate which is made to be a preselected fraction including unity of said first rate, and means for measuring the temperature of the vapors produced in said vessel as an indication of the particular distillation point of said stream which is being determined.

3. Apparatus as defined in claim 2, including also means for automatically controlling said heating means to maintain substantially constant the distillate production rate, as the distillation point of the liquid stream changes.

4. Apparatus as defined in claim 3, wherein the automatic controlling means comprises means for controlling said heating means so as to maintain the reflux rate from said condenser substantially constant.

5. Apparatus as defined in claim 3, wherein the automatic controlling means comprises means for sensing the rate of reflux from said condenser and for developing a signal proportional to such rate, and means for utilizing said signal for controlling said heating means so as to maintain said reflux rate substantially constant.

6. Apparatus for continuously analyzing a stream of liquid to determine any preselected distillation point thereof, comprising a heated still with a condenser coupled thereto; means for returning distillate from said condenser to said still as reflux, means for continuously feeding at a first predetermined rate to said still the liquid stream to be analyzed, means for continuously removing distillate from said condenser and still at a second rate which is made to be a preselected fraction of said first rate, means coupled to said still for draining off excess liquid which tends to accumulate therein, and means for continuously measuring the temperature of the vapors produced in said still as an indication of the selected distillation point of said stream.

7. Apparatus as defined in claim 1, wherein each of said feeding means and said extracting means includes a respective pump of adjustable pumping rate.

8. Apparatus as defined in claim 1, wherein the extracting means discharges the distillate extracted into a coupling separate from said vessel.

9. Apparatus as defined in claim 7, wherein the discharge of the extracting pump is separate from said vessel.

10. Apparatus as defined in claim 6, wherein each of said feeding means and said extracting means includes a respective pump of adjustable pumping rate.

11. Apparatus as defined in claim 6, wherein the extracting means discharges the distillate extracted into a coupling separate from said vessel.

12. Apparatus for analyzing a stream of liquid to determine a preselected distillation point thereof comprising a first heated distillation vessel for vaporizing at least a portion of the liquid fed thereto, a first condenser operatively connected to the upper part of said vessel to condense vapors produced therein, means for feeding at a first predetermined rate to said vessel the liquid stream to be analyzed, means for extracting distillate from said condenser at a second predetermined rate which is a fraction of said first rate, a second heated distillation vessel for vaporizing at least a portion of the liquid fed thereto, a second condenser operatively connected to the upper part of said second vessel to condense the vapors produced therein, means for utilizing the bottoms overflow from said first vessel as feed for said second vessel, means for extracting distillate from said second condenser at a third predetermined rate which is a fraction of said first rate, and means for measuring the temperature of the vapors produced in said second vessel.

13. Apparatus in accordance with claim 12, characterized in that said third rate is lower than said second rate.

14. Apparatus in accordance with claim 12, characterized in that the percentage of the feed to said first vessel which is extracted as distillate from said first condenser is approximately equal to the percentage of the feed to said second vessel which is extracted as distillate from said second condenser.

15. Apparatus in accordance with claim 12, characterized in that the ratio of the sum of said second and third rates to said first rate, expressed in percent, is the same as the percentage distillation point desired to be determined.

16. Apparatus as defined in claim 12, wherein the heat input to said first vessel is sufficient to produce distillate at a rate at least equal to said second rate, and wherein the heat input to said second vessel is sufficient to produce distillate at a rate at least equal to said third rate.

17. Apparatus as defined in claim 12, wherein said third rate is lower than the feed rate to said second vessel, and wherein an overflow conduit is connected to said second vessel for draining off excess liquid which tends to accumulate therein.

18. Apparatus in accordance with claim 12, characterized in that said third rate is lower than said second rate, and also in that the percentage of the feed to said first vessel which is extracted as distillate from said first condenser is approximately equal to the percentage of the feed to said second vessel which is extracted as distillate from said second condenser.

19. Apparatus in accordance with claim 12, characterized in that said third rate is lower than said second rate, and also in that the ratio of the sum of said second and third rates to said first rate, expressed in percent, is the same as the percentage distillation point desired to be determined.

20. Apparatus in accordance with claim 12, characterized in that said third rate is lower than said second rate, in that the ratio of the sum of said second and third rates to said first rate, expressed in percent, is the same as the percentage distillation point desired to be determined, and also in that the percentage of the feed to said first vessel which is extracted as distillate from said first condenser is approximately equal to the percentage of the feed to said second vessel which is extracted as distillate from said second condenser.

21. Apparatus as defined in claim 12, wherein the heat input to said first vessel is sufficient to produce distillate at a rate at least equal to said second rate, wherein the heat input to said second vessel is sufficient to produce distillate at a rate at least equal to said third rate, and wherein the ratio of the sum of said second and third rates to said first rate, expressed in percent, is the same as the percentage distillation point desired to be determined.

22. Apparatus for continuously analyzing a stream of liquid to determine a preselected distillation point thereof comprising a first heated still, a first condenser operatively connected to said still to condense vapors produced therein, means for continuously feeding at a first predetermined rate to said still the liquid stream to be analyzed, means for continuously extracting distillate from said condenser at a second predetermined rate which is a fraction of said first rate, a second heated still, a second condenser operatively connected to said second still to condense vapors produced therein, means for continuously feeding the bottoms overflow from said first still to said second still, means for continuously extracting distillate from said second condenser at a third predetermined rate which is a fraction of said first rate, means coupled to said second still for draining off excess liquid which tends to accumulate therein, and means for continuously measuring the temperature of the vapors produced in said second still.

23. Apparatus in accordance with claim 22, characterized in that said third rate is lower than said second rate.

24. Apparatus in accordance with claim 22, characterized in that the percentage of the feed to said first still which is extracted as distillate from said first condenser is approximately equal to the percentage of the feed to said second still which is extracted as distillate from said second condenser.

25. Apparatus in accordance with claim 22, characterized in that the ratio of the sum of said second and third rates to said first rate, expressed in percent, is the same as the percentage distillation point desired to be determined.

26. Apparatus as defined in claim 22, wherein the heat input to said first still is sufficient to produce distillate at a rate at least equal to said second rate, and wherein the heat input to said second still is sufficient to produce distillate at a rate at least equal to said third rate.

27. Apparatus in accordance with claim 22, characterized in that said third rate is lower than said second rate, and also in that the percentage of the feed to said first still which is extracted as distillate from said first condenser is approximately equal to the percentage of the feed to said second still which is extracted as distillate from said second condenser.

28. Apparatus in accordance with claim 22, characterized in that said third rate is lower than said second rate, and also in that the ratio of the sum of said second and third rates to said first rate, expressed in percent, is the same as the percentage distillation point desired to be determined.

29. Apparatus in accordance with claim 22, characterized in that said third rate is lower than said second rate, in that the ratio of the sum of said second and third rates to said first rate, expressed in percent, is the same as the percentage distillation point desired to be determined, and also in that the percentage of the feed to said first still which is extracted as distillate from said first condenser is approximately equal to the percentage of the feed to said second still which is extracted as distillate from said second condenser.

References Cited in the file of this patent

UNITED STATES PATENTS

| | | |
|---|---|---|
| 2,489,949 | Blair | Nov. 29, 1949 |
| 2,594,683 | Rolfson | Apr. 29, 1952 |